United States Patent
Adams et al.

(10) Patent No.: US 9,376,079 B2
(45) Date of Patent: *Jun. 28, 2016

(54) AUTOMATED VISION INSPECTION OF A SIDE CURTAIN AIRBAG ASSEMBLY

(71) Applicant: Honda Motor Co., Ltd., Tokyo (JP)

(72) Inventors: James Wesley Adams, Dublin, OH (US); Alec Peter Bacon, Upper Sandusky, OH (US)

(73) Assignee: Honda Motor Co., Ltd., Tokyo (JP)

( * ) Notice: Subject to any disclaimer, the term of this patent is extended or adjusted under 35 U.S.C. 154(b) by 173 days.

This patent is subject to a terminal disclaimer.

(21) Appl. No.: 14/046,038

(22) Filed: Oct. 4, 2013

(65) Prior Publication Data

US 2014/0099015 A1   Apr. 10, 2014

Related U.S. Application Data

(60) Provisional application No. 61/709,637, filed on Oct. 4, 2012.

(51) Int. Cl.
| | |
|---|---|
| *G06K 9/00* | (2006.01) |
| *B60R 21/20* | (2011.01) |
| *B60R 21/23* | (2006.01) |
| *G06T 7/00* | (2006.01) |

(Continued)

(52) U.S. Cl.
CPC .............. *B60R 21/20* (2013.01); *B60R 21/213* (2013.01); *B60R 21/23* (2013.01); *B60R 21/232* (2013.01); *G06T 7/001* (2013.01); *G06T 7/0004* (2013.01); *G06T 2207/30124* (2013.01); *G06T 2207/30208* (2013.01)

(58) Field of Classification Search
USPC ......... 382/141, 149, 151, 152, 209, 278, 291; 348/86, 95
See application file for complete search history.

(56) References Cited

U.S. PATENT DOCUMENTS

| | | | | |
|---|---|---|---|---|
| 6,910,711 B1 * | 6/2005 | Breed | .................... | B60N 2/002 180/272 |
| 7,063,350 B2 * | 6/2006 | Steimke | .................. | B60R 21/26 280/729 |

(Continued)

FOREIGN PATENT DOCUMENTS

| | | |
|---|---|---|
| JP | 11321532 | 11/1999 |
| JP | 2004-098707 | 4/2004 |

(Continued)

OTHER PUBLICATIONS

RD497048, Sep. 25, 2005, Anonymous.

(Continued)

*Primary Examiner* — Yosef Kassa
(74) *Attorney, Agent, or Firm* — Rankin, Hill & Clark LLP (57) ABSTRACT

An automated vision inspection system detects whether a cushion of a side curtain airbag assembly system is twisted. The cushion is provided a plurality of markings arrayed along a longitudinal extent of the cushion. Each marking can be defined by a group of four distinct characters or indicia. Each indicium can be defined by polygonal shaped pixels which allow the inspection system to find clear edges of the marking and thereby determine marking orientation. By determining orientation, the inspection system can compare the inspected marking to a master image of the marking to determine if the cushion is in a twisted state or non-twisted state.

12 Claims, 11 Drawing Sheets

(51) Int. Cl.
  *B60R 21/213* (2011.01)
  *B60R 21/232* (2011.01)

(56) References Cited

U.S. PATENT DOCUMENTS

| | | | | |
|---|---|---|---|---|
| 7,147,245 | B2 * | 12/2006 | Florsheimer | B60R 21/205 |
| | | | | 280/735 |
| 7,469,924 | B2 * | 12/2008 | Theisen | B60R 21/01554 |
| | | | | 280/735 |
| 7,568,727 | B2 * | 8/2009 | Ryan | B60R 21/01504 |
| | | | | 280/728.1 |
| 7,610,821 | B2 * | 11/2009 | Klein | G01M 17/0078 |
| | | | | 73/865.3 |
| 7,663,502 | B2 * | 2/2010 | Breed | B60C 11/24 |
| | | | | 340/12.25 |
| 8,083,255 | B2 | 12/2011 | Okimoto et al. | |
| 8,523,221 | B2 * | 9/2013 | Muller | B60R 21/201 |
| | | | | 280/730.2 |
| 2013/0113192 | A1 * | 5/2013 | Richards | B60R 21/201 |
| | | | | 280/730.2 |
| 2013/0194471 | A1 * | 8/2013 | Yamashita | H04N 5/374 |
| | | | | 348/308 |

FOREIGN PATENT DOCUMENTS

| | | |
|---|---|---|
| JP | 2004-224255 | 8/2004 |
| JP | 2004-291724 | 10/2004 |
| JP | 2006-117112 | 5/2006 |
| JP | 2010-126078 | 6/2010 |

OTHER PUBLICATIONS

Office Action of U.S. Appl. No. 14/046,142 dated May 22, 2015, 9 pages.

* cited by examiner

AUTOMATED VISION INSPECTION OF A SIDE CURTAIN AIRBAG ASSEMBLY

The present application claims priority to U.S. Provisional Patent Application Ser. No. 61/709,637, filed on Oct. 4, 2012, the disclosure of which is incorporated herein by reference.

BACKGROUND

Exemplary embodiments herein generally relate to a side curtain airbag, and more particularly, to an automated vision inspection of a side curtain airbag assembly for detecting whether a cushion of the side curtain airbag assembly is in a twisted state at the time of installation.

The side curtain airbag assembly is a common safety device applied to passenger vehicles and is deployed to protect the occupants of the vehicle from a side impact head injury and to resist ejection from the vehicle in the case of a rollover. Generally, the side curtain airbag assembly includes a cushion, an inflator, mounting hardware and a variety of other hardware based on the requirements of the application. When the side curtain airbag assembly is manufactured, the cushion is rolled or folded to minimize the space occupied by the device in the vehicle. In some designs, the rolled or folded cushion is covered by a sock. The sock is a sleeve of material which has a sewn seam or perforated line which ruptures when the inflation of the cushion begins. The side curtain airbag assembly is installed in a manner that the device begins generally at the base of the A-pillar (front), up the A-pillar, along the length of the roof, down the rear pillar (B, C or D) and ends at the rear of the passenger compartment. In the simplest arrangement, the side curtain airbag assembly is long (two to four meters), slender (30 to 120 millimeters in circumference), and quite flexible (bend and twist). Due to its flexibility, installation must be done carefully to ensure the side curtain airbag assembly is not mounted to the vehicle with a longitudinal 360 degree twist imparted to the cushion. A twisted cushion may not deploy properly and thus may not provide the desired passenger safety protection.

To ensure proper installation, various vehicle manufactures have applied markings to the cushion and/or cover to make recognizing a twist with the human eye easier. Other manufacturers have employed hardware added to the side curtain airbag assembly to make imparting a 360 degree twist difficult. In some cases, the additional hardware is quite extensive and thus adds weight and cost to the side curtain airbag. Therefore, it is desirable to eliminate such weight and cost as long as other measures are taken to ensure a proper installation of the side curtain airbag. Automated vision inspection offers such protection, but while the technology is robust enough to detect a twisted installation, the technology is prone to false detections. False detections are disruptive to manufacturing operations and thus resistance to application of vision inspection technology exists.

Automated vision inspection involves the capture of digital images of the installed side curtain airbag assembly and processing those images through imaging processing software that has been programmed to look for key features previously defined and to assess the installed condition by comparison of the current image to a master image. Due to the flexible nature of the side curtain airbag assembly, each installation is unique and thus, the master image would only give a satisfactory judgment when compared to itself. Therefore, for automated inspection, it is important to provide the image processing software with markings on the device that do not appear elsewhere in the image and that can be found by the vision inspection software and evaluated for presence and position.

Figure 14:
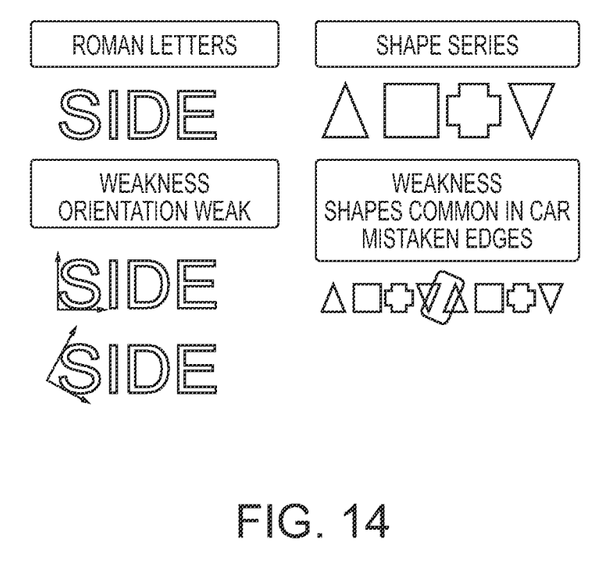
FIG. 14 depicts the weaknesses of using Roman letters or geometric shapes as indicium in a marking system.

Traditional markings on the side curtain airbag assembly such as barcodes, writing (in any language) or stripes can be used to assist the human eye in detecting twists, but fail to reliably prevent misinterpretation of features in the image when utilizing an automated vision inspection system. For example, in the case of a longitudinal stripe, the two dimensional appearance of the edge of the stripe can appear similar to the edge of the side curtain airbag against the vehicle body. Likewise, the shadow cast by the side curtain airbag can appear as a stripe. Also, the edge features of the vehicle, such as a door opening, can create a line that can be misinterpreted as a cushion stripe. Further, writing on the cushion of the side curtain airbag can create different possibilities of misinterpretation. For example, and as depicted in FIG. 14, consider a cushion with a series of letters or words printed on its entire length. A twisted installation of the cushion would create a gap in the words or letter string. However, if the words are arranged into a phrase, the natural gap between words can be misinterpreted as gaps created by a twisted installation. And, many Roman letters, such as the letter "S", have rounded sides. These rounded sides can make determining the bottom and side of the mark difficult, and therefore determining orientation can be difficult. In addition, geometric shapes provided on a length of the side airbag cushion can have issues in interpretation. First, many of these geometric shapes appear in the vehicle in other locations. For example, round, triangular, rectangular and square holes are generally stamped into the vehicle body. Bolts with hexagonal heads, hexagonal pockets or round flanges are used during assembly. If the automated vision inspection system is looking for one of these geometric shapes, the vision system may lock onto a feature in the vehicle rather than the geometric mark on the airbag. Furthermore, as shown in FIG. 14, parallel edges of these shapes can be mistakenly used by the vision system to complete partial shapes. For example, if the right edge of the left hand triangle were missing due to a part covering it, the left edge of the right hand triangle could be used to complete the shape of the left hand triangle.

BRIEF DESCRIPTION

In accordance with one aspect, an automated vision inspection system detects whether a cushion of a side curtain airbag assembly system is twisted. At least one of the cushion or a sock covering the cushion is provided a plurality of markings arrayed along a longitudinal extent of the same. Each marking can be defined by a group, e.g., four distinct characters or indicia. Each indicium can be defined by polygonal shaped pixels which allow the inspection system to find clear edges of the marking and thereby determine marking orientation. The edges of one indicium do not match the edges of another indicium in a single marking. By determining orientation, the inspection system can compare the inspected marking to a master image of the marking. The inspection system can determine a match percentage of the pixels defining the edge of the inspected indicia or of the pixels within the area inscribed by the edges of the inspected indicia as compared to the same pixels of the master image. Further, the upper portion and the lower portion of each marking can define a unique separate marking. This allows for confirmation if a portion of the marking is covered or rotated out of view. The repetitive markings also allows for subsequent confirmation. By providing markings having a small width, a high quantity of repeat markings allows the inspection system to also measure the distance between adjacent markings and count marking occurrences. The marking can also be a symbolic ambigram (appears the same if flipped 180°), which allows for simplified manufacturing by reducing the need to control orientation.

In accordance with another aspect, an automated vision inspection system for detecting whether a cushion of a side curtain airbag assembly system is in a properly installed or twisted state comprises a plurality of markings arrayed along a longitudinal extent of one of a cushion or a sock covering the cushion of a side cushion airbag assembly. Each marking includes at least one indicium defined by a plurality of polygonal shaped pixels. A detector is configured to capture digital images of the at least one indicium of the plurality of markings. A controller is configured to process the digital images captured by the detector and determine presence of the at least one indicium of the plurality of markings to access an installed condition of the cushion or sock by comparison of the digital images to master images.

In accordance with yet another aspect, a side curtain airbag assembly comprises an inflatable cushion and a sock for housing the cushion in a folded state. At least one of the cushion and sock includes a plurality of spaced markings arrayed along its respective longitudinal extent. Each marking is defined by at least two indicia including a first indicium and a second indicium. Each of the first indicium and second indicium is formed from a plurality of similarly shaped and sized interconnected pixels which together provide for first and second indicia having a predetermined height and width.

In accordance with still yet another aspect, a method of accessing an installed condition of a side curtain airbag assembly comprises providing a plurality of spaced markings along a length of a cushion or sock of the side curtain airbag assembly; defining each marking by at least two indicia including a first indicium and a second indicium having a shape differing from a shape of the first indicium, each of the first indicium and second indicium being formed from a plurality of similarly shaped and sized interconnected pixels; capturing images with a detector of the first and second indicia of the plurality of markings; and comparing the captured images of the first and second indicia of the plurality of marking with master images of the first and second indicia of the plurality of markings with a controller in communication with the detector to determine presence of each of the plurality of markings.

DETAILED DESCRIPTION

It should, of course, be understood that the description and drawings herein are merely illustrative and that various modifications and changes can be made in the structures disclosed without departing from the present disclosure. It should be appreciated that the term "plurality" means "two or more", unless expressly specified otherwise. It will also be appreciated that the various identified components of the side curtain airbag assembly disclosed herein are merely terms of art that may vary from one manufacturer to another and should not be deemed to limit the present disclosure.

Figure 1:
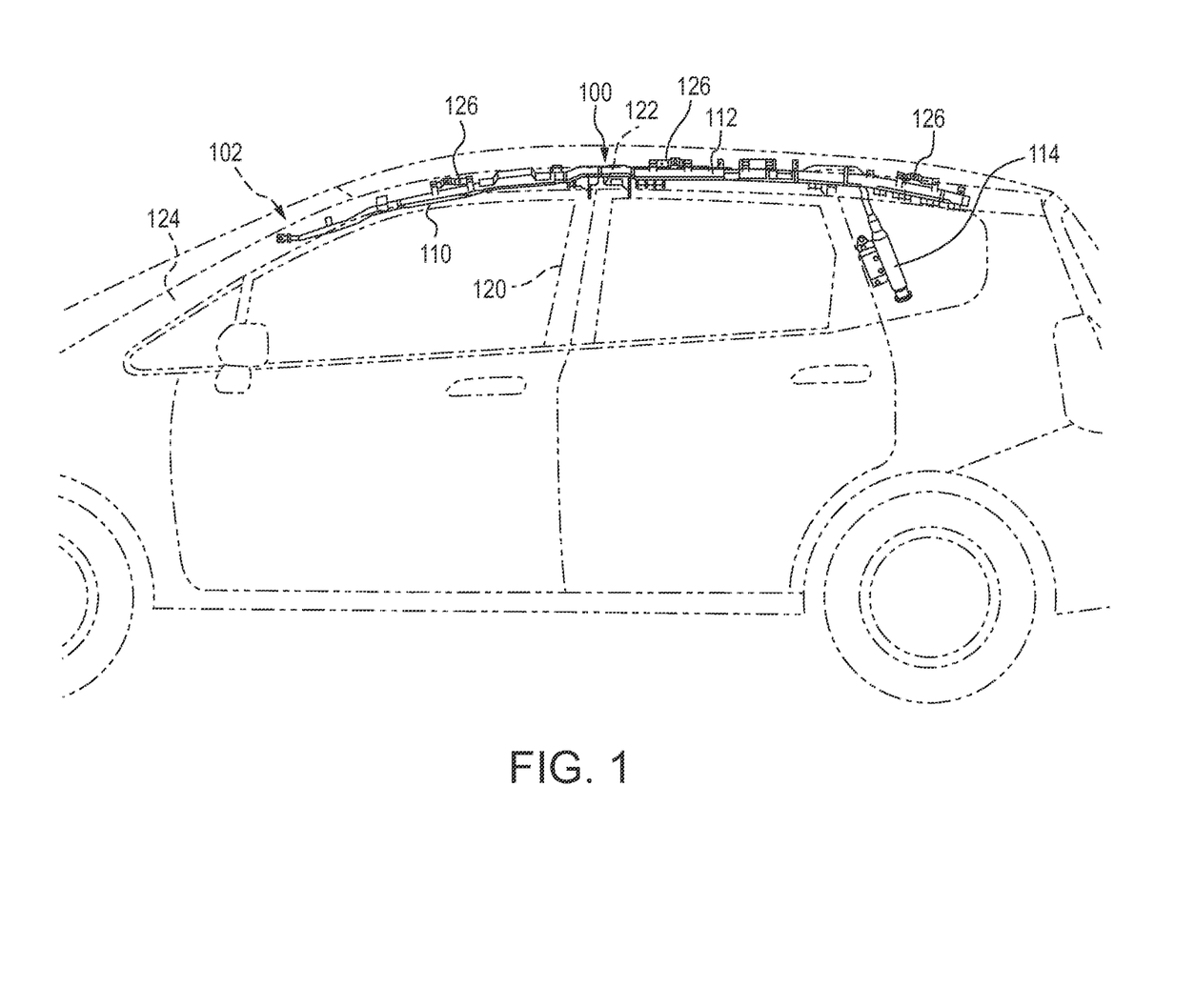
FIG. 1 is a side view of a side curtain airbag assembly showing the side curtain airbag assembly disposed on a right side of the vehicle, which is seen from a left side of the vehicle.
Figures 2, 3:
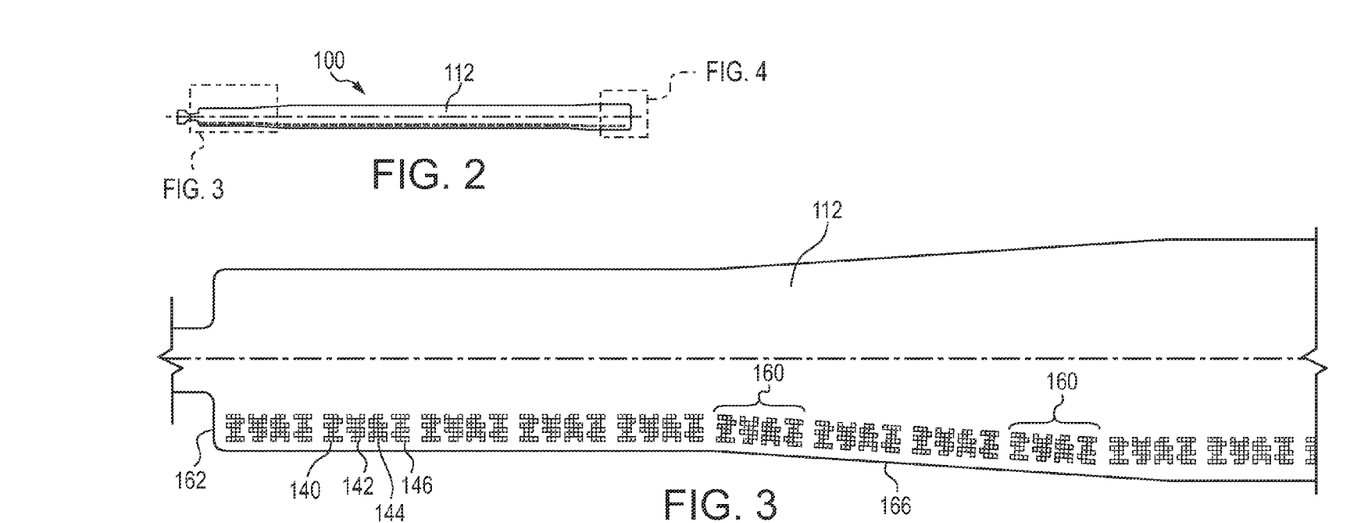
FIG. 2 is a view of an open sock which covers a cushion of the side curtain airbag assembly of FIG. 1. This material of the sock is folded and sewn along the mating edge to create a sleeve that is pulled over the rolled or folded cushion to retain the shape of the cushion. The flat sock material can also be wrapped around the cushion and sewn closed or closed with fasteners or tape. A plurality of marking according to one aspect of the present disclosure is arrayed along a length of the sock.
FIG. 3 is an enlarged side view of a front or forward end portion of the sock of FIG. 2.
Figure 4:
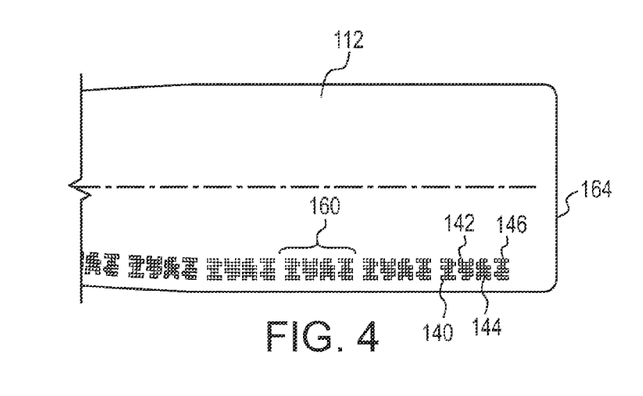
FIG. 4 is an enlarged side view of a rear end portion of the sock of FIG. 2.

Referring now to the drawings, wherein like numerals refer to like parts throughout the several views, FIG. 1 schematically illustrates a side curtain airbag assembly 100 disposed on a right side of a vehicle 102. Herein, when a direction is described, the direction is based on a direction defined by front and rear sides of the vehicle and right and left sides of the vehicle as viewed from the driver's seat of the vehicle. It should be appreciated that a corresponding side curtain airbag assembly is provided on a left side of the vehicle 102. Therefore, only on the side curtain airbag assembly 100 on the right side of the vehicle 102 will be described, and the description of the side curtain airbag assembly on the left side of the vehicle will be omitted since each side curtain airbag assembly has the identical structure.

As shown in FIG. 1, the side curtain airbag assembly 100 includes a cushion 110, a sock or cover 112 for housing the cushion in a folded state, an inflator 114, mounting hardware and a variety of other hardware based on the requirements of the application. The cushion 110 of the side curtain airbag assembly 100 is deployed to protect the occupants of the vehicle 102 from a side impact head injury and to resist ejection from the vehicle 102 in the case of a rollover. The inflator 114 expands the cushion 110, and in doing so, ruptures the sewn seam, perforated line 116 (FIG. 5) or other means of closure in the sock 112, and the cushion inflates and expands from an upper portion to a lower portion of the window openings 120 along the vehicle interior side of the window openings at the time of a vehicle collision. The side curtain airbag assembly 100 is disposed at the upper portion of the window openings 120 of the vehicle 102, extending from the front side to the rear side of the vehicle. Specifically, the side curtain airbag assembly 100 is provided along a roof side rail 122 extending from and covering a front pillar or A-pillar 124 in the vehicle interior of the vehicle 102. The side curtain airbag assembly 100 can be fixed onto the vehicle via a plurality of brackets 126 provided with the upper portions of the cover 112.

With reference now to FIGS. 2-6, at least one of the cushion 110 and the sock 112 of the side curtain airbag assembly 100 is provided with a plurality of exemplary characters or indicia 140, 142, 144, 146 designed to improve the accuracy of the automated inspection of the side curtain airbag. In the depicted embodiment, the indicia are provided on the sock 112; although, it should be appreciated that the indicia can be provided on the cushion 110. The indicia 140, 142, 144, 146 give a visible marking for the human eye, but also enable an automated vision inspection system 150 (see FIG. 11) to quickly determine the state of the installed cushion 110 of the side curtain airbag assembly 100. In order words, with the exemplary indicia, a cushion in a twisted state is easily detectible and false detections are minimized. As shown, the indicia 140, 142, 144, 146 are grouped together to define a single word or marking 160 which is arrayed in a repeating manner along a longitudinal direction of the sock 112. The array of markings 160 is spaced a predetermined distance from a forward end 162 and rearward end 164 of the sock 112, and also from a lower edge 166 of the sock in a flattened state. According to one aspect of the present disclosure, the indicium 140 of the foremost marking 160 is spaced less than 10 mm from the forward end 162, for example about 6 mm from the forward end, and the indicium 146 of the rearmost marking is spaced about 28 mm from the rearward end 164. Further, the distance from the lower edge 166 of the sock 112 to the lower edge of the array of markings 160 can vary to insure visibility depending on the location of the sock 112 relative to the vehicle body and the tolerances associated with the fabrication of the cushion 110 or sock 112. For example, the distance from the lower edge 166 to the array of markings 160 can range from about 4.5 mm to about 6.5 mm depending on the location of the sock 112 relative to the vehicle body and the tolerances associated with the fabrication of the cushion 110 or sock 112. For example, the distance between the markings 160 and the lower edge 166 near the A-pillar 124 can be smaller than the distance between the markings 160 and the lower edge 166 near one of the remaining pillars. More particularly, according to another aspect of the present disclosure, the markings 160 provided on the exemplary sock 112 near the A-pillar 124 can be spaced about 4.5 mm from the lower edge 166 and this spacing can gradually increase to about 6.5 mm for markings 160 provided rearward of the A-pillar 124. Furthermore, adjacent markings 160 may be spaced a predetermined distance apart, and according to one embodiment, this spacing between adjacent markings 160 is about 6 mm (see FIG. 7). It should be appreciated that providing of a slightly larger space between marking groups than that between individual markings facilitates ease of automated vision programming.

Figure 5:
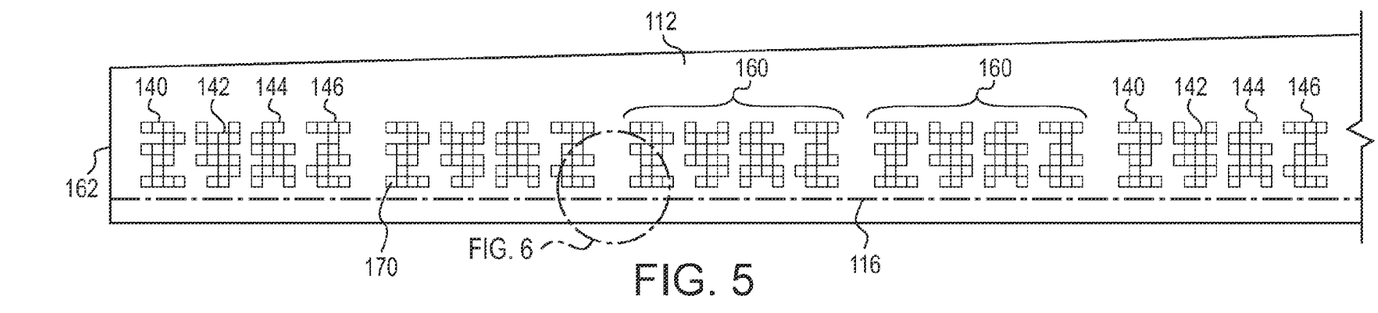
FIG. 5 is an enlarged view of the folded and sewn sock front end portion of FIG. 3.
Figure 6:
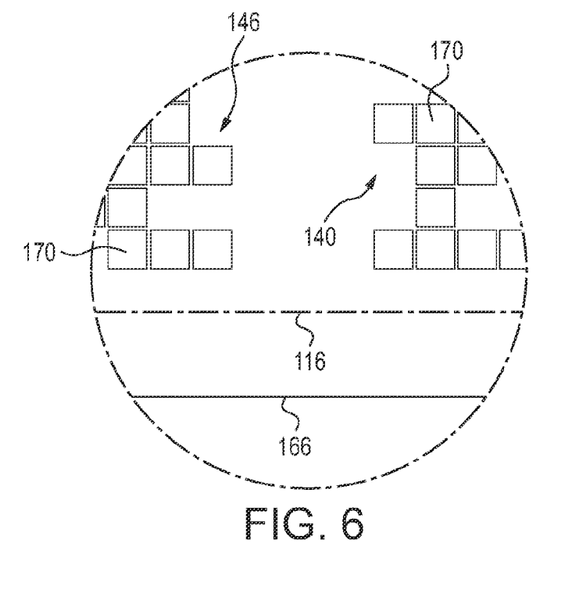
FIG. 6 is an enlarged view of a section of the sock of FIG. 5.
Figure 7:
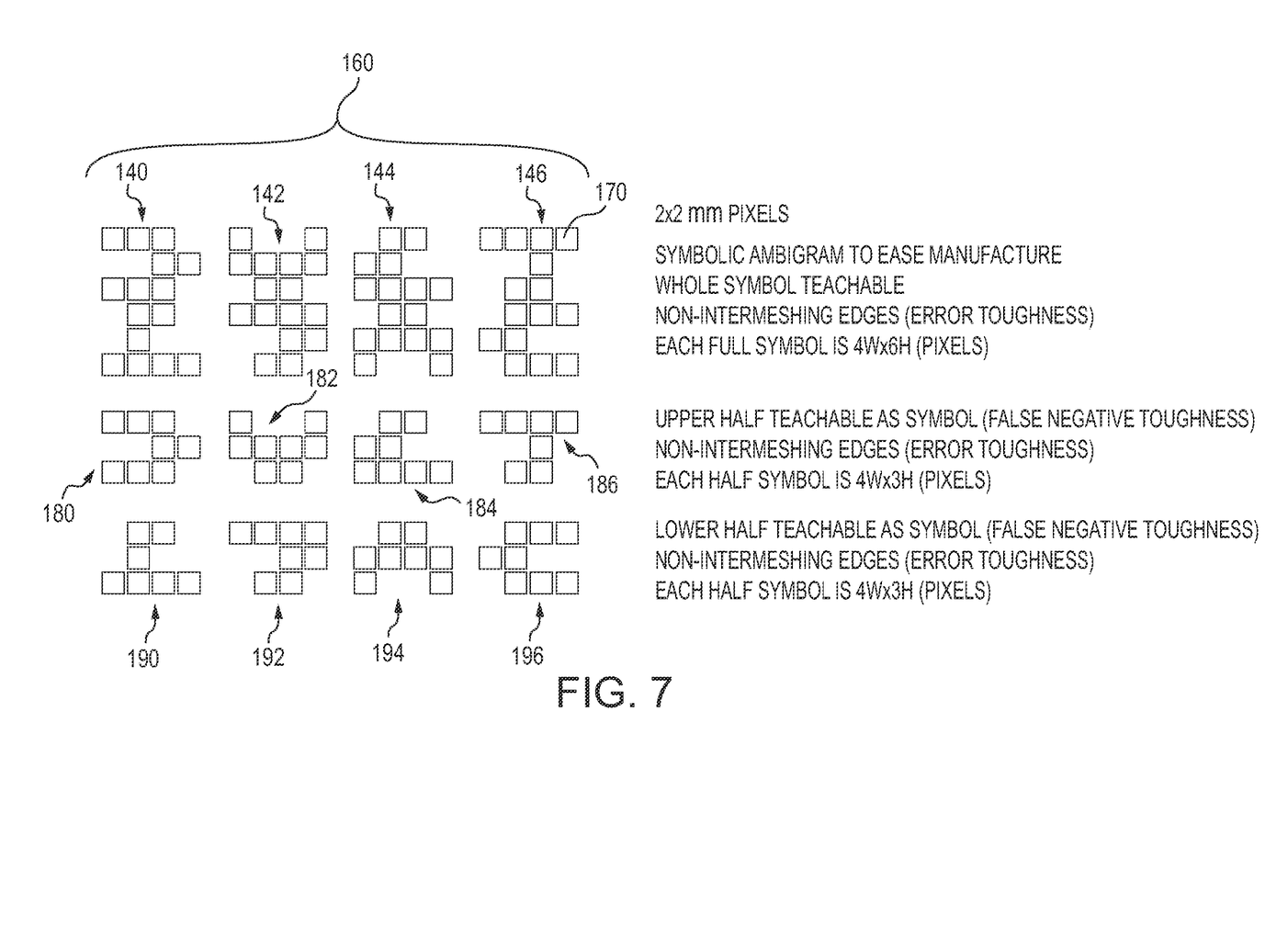
FIGS. 7 and 8 further depict a group of indicia of FIG. 5 including exemplary characteristics of the indicia.

As shown in FIGS. 5 and 6, each indicium of the indicia 140, 142, 144, 146 can be formed from a plurality of similarly shaped and sized interconnected pixels 170 which together provide for indicium having a predetermined height and width, and a predetermined spacing between adjacent indicium of each marking 160. Particularly, and according to one aspect, each pixel can be a 2 mm by 2 mm square, with the height of each indicium 140, 142, 144, 146 of about 12 mm (i.e., 6 2×2 mm pixels), a width of each indicium 140, 142, 144, 146 of about 8 mm (i.e., 4 2×2 mm pixels), and the spacing between adjacent indicium of each marking 160 of about 2 mm. Thus, the pixels 170 of each indicium 140, 142, 144, 146 generally define a table having 4 columns and 6 rows, with certain of the cells (i.e., pixels 170) active (i.e., marked or colored) and certain of the cells inactive (i.e., clear or non-colored) to define a unique shape for that indicium. More particularly, the table below illustrates the basic outline for the indicia, with each cell of the table defining one of the pixels 170 that collectively form that indicium. For example, indicium 140 has cells D-1, A-2, B-2, D-3, A-4, D-4, A-5, C-5, and D-5 inactive with the remaining cells active. Indicium 142 has cells B-1, C-1, A-3, D-3, A-5, B-5, A-6 and D-6 inactive with the remaining cells active. Indicium 144 is identical to indicium 142 rotated 180 degrees. Similarly, indicium 146 is identical to indicium 140 rotated 180 degrees.

| A-1 | B-1 | C-1 | D-1 |
| A-2 | B-2 | C-2 | D-2 |
| A-3 | B-3 | C-3 | D-3 |
| A-4 | B-4 | C-4 | D-4 |
| A-5 | B-5 | C-5 | D-5 |
| A-6 | B-6 | C-6 | D-6 |

It should be appreciated that the present disclosure is not limited to the depicted square shaped pixels, and that alternative polygonal shapes and sizes for the pixels 170 are contemplated. For example, the pixels 170 can be pentagon or octagon shaped, with that shape being defined by one of the cells in the table above. Also, it should be appreciated that combinations of polygons (i.e., square and pentagon) can be used as the shapes of the pixels that define each indicium 140, 142, 144, 146.

Figure 8:
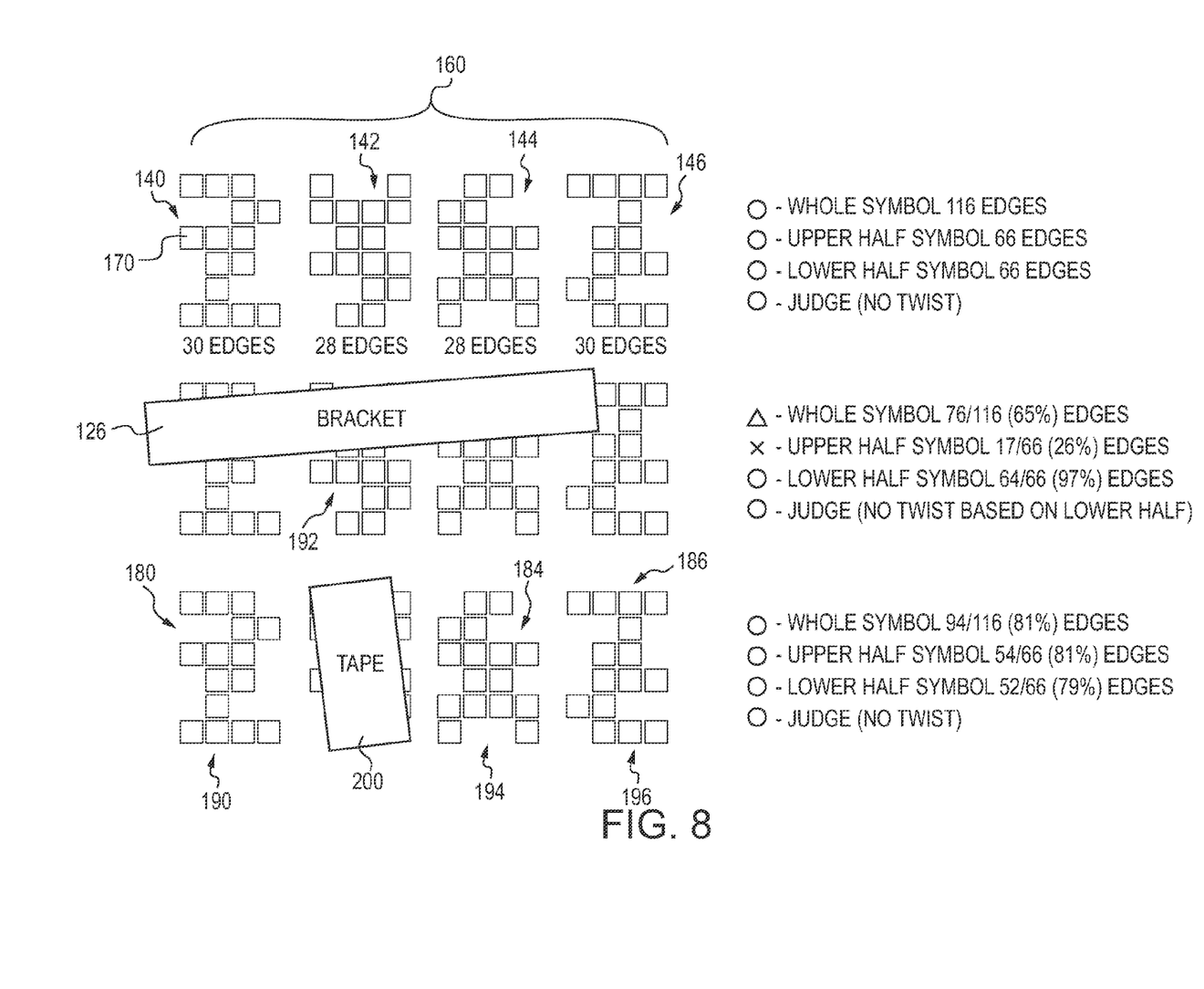
Figure 11:
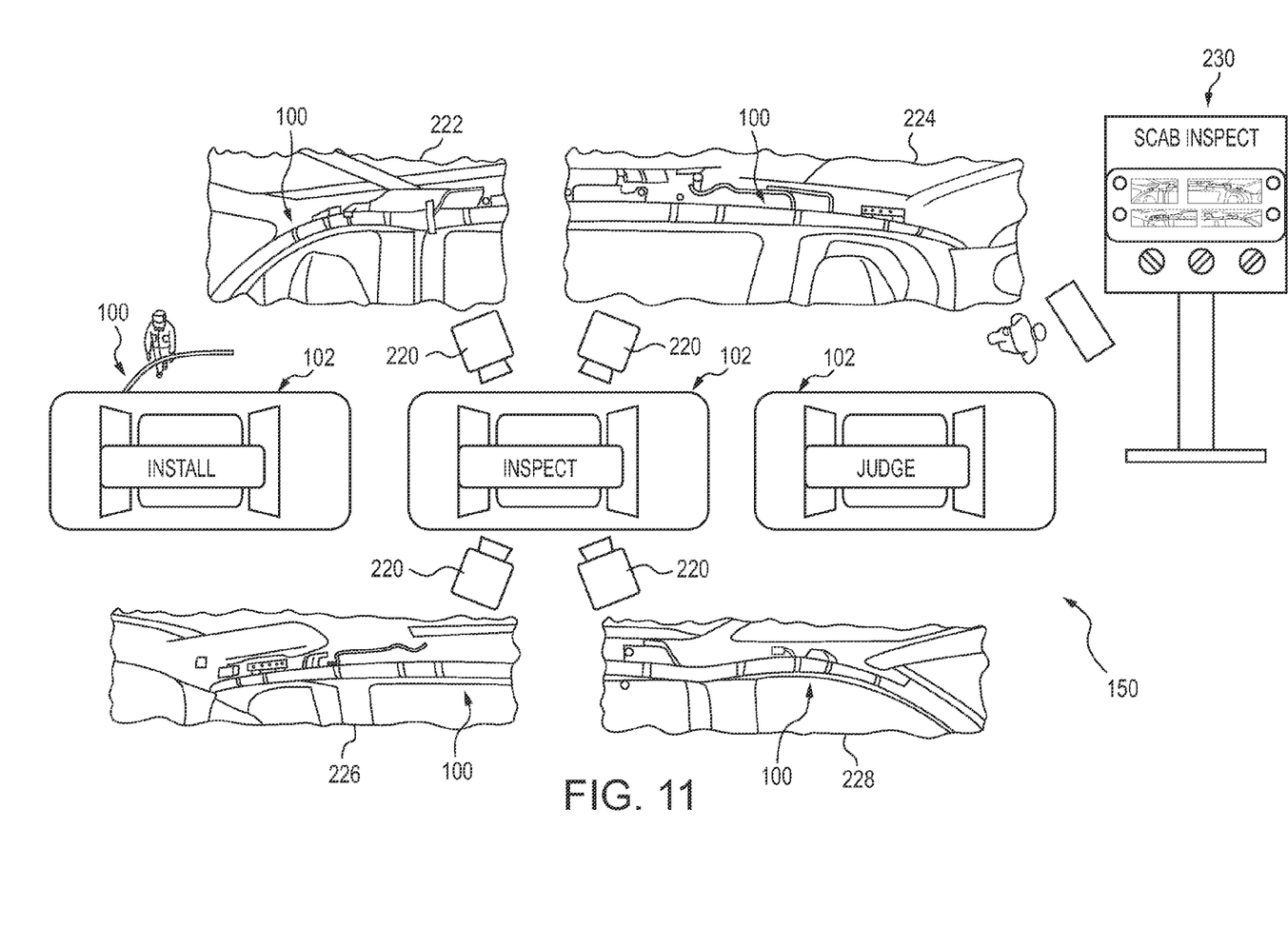
FIG. 11 shows the installation and automated inspection of the side curtain airbag assembly of FIG. 1 according to one aspect of the present disclosure.

Thus, the exemplary configuration of each indicium 140, 142, 144, 146 provides for a marking 160 that is a symbolic ambigram for ease of manufacture of the sock 112. Further, each indicium as a whole can be a teachable symbol for the automated vision inspection system 150 (FIG. 11). And the pixels 170 of each indicium define non-intermeshing edges that can be detected by the inspection system 150 to reduce error during the automated inspection of the cushion 110. For example, and with the exemplary configurations shown in FIG. 8, indicium 140 has thirty (30) exterior edges, indicium 142 has twenty-eight (28) exterior edges, indicium 144 has twenty-eight (28) exterior edges and indicium 146 has thirty (30) exterior edges, for a total of one hundred sixteen (116) exterior edges for each marking 160. Each exterior edge segment is broken into individual pixels in the digital image and comparisons of these pixels between the master image and inspected image is completed by the inspection system 150. Thus, detection of a predetermined percentage of the pixels for each of the one hundred sixteen (116) edges for one of the markings 160 by the inspection system 150 is indicative of a non-twist state for a portion of the cushion 110 associated with that detected marking.

Figure 10:
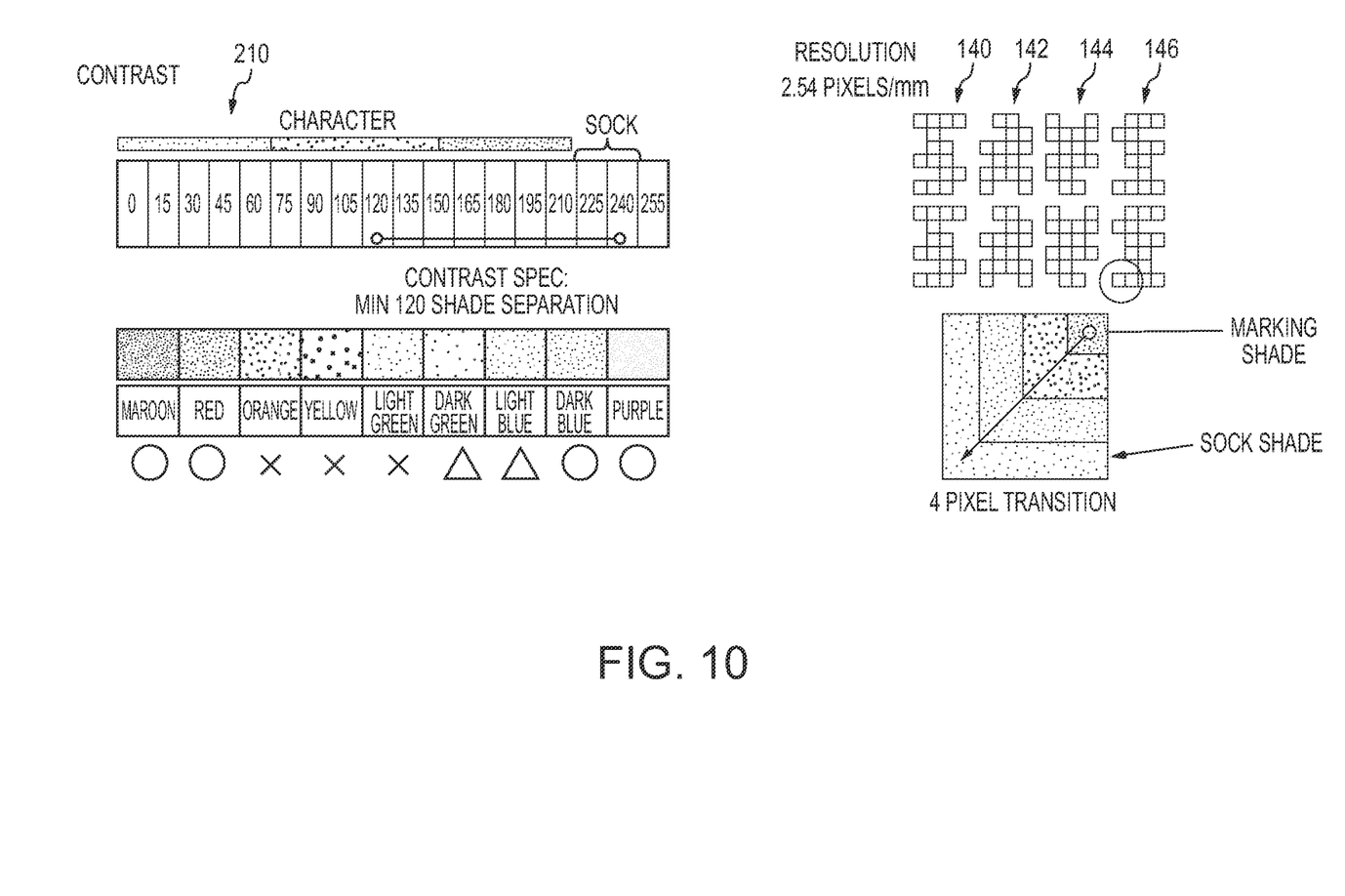
FIG. 10 shows the pixel contrast transition between the sock material of FIG. 2 and the groups of indicia provided thereon.

Additionally, the indicia 140, 142, 144, 146 of each marking 160 can be separated (for detection purposes) into respective upper portions 180, 182, 184, 186 and respective lower portions 190, 192, 194, 196. In the depicted embodiment, each upper portion and lower portion has a height of about 6 mm (i.e., 3, 2×2 mm pixels) and a width of about 8 mm (i.e., 4 2×2 mm pixels), and can be a teachable symbol for the automated vision inspection system 150. The pixels 170 for each upper and lower portion can also define non-intermeshing edges that can reduce error during the automated inspection of the installed side curtain airbag assembly 100. For example, as shown in FIG. 10, each upper portion 180, 182, 184, 186 and each lower portion 190, 192, 194, 196 of the respective indicia 140, 142, 144, 146 has sixty-six (66) exterior edges. Thus, detection of a predetermined percentage of the pixilated sixty-six (66) exterior upper edges or a predetermined percentage of the pixilated sixty-six (66) lower exterior edges for a marking 160 by the inspection system 150 is also indicative of a non-twist state for the portion of the cushion 110 or sock 112 associated with the detected marking.

Figure 9:
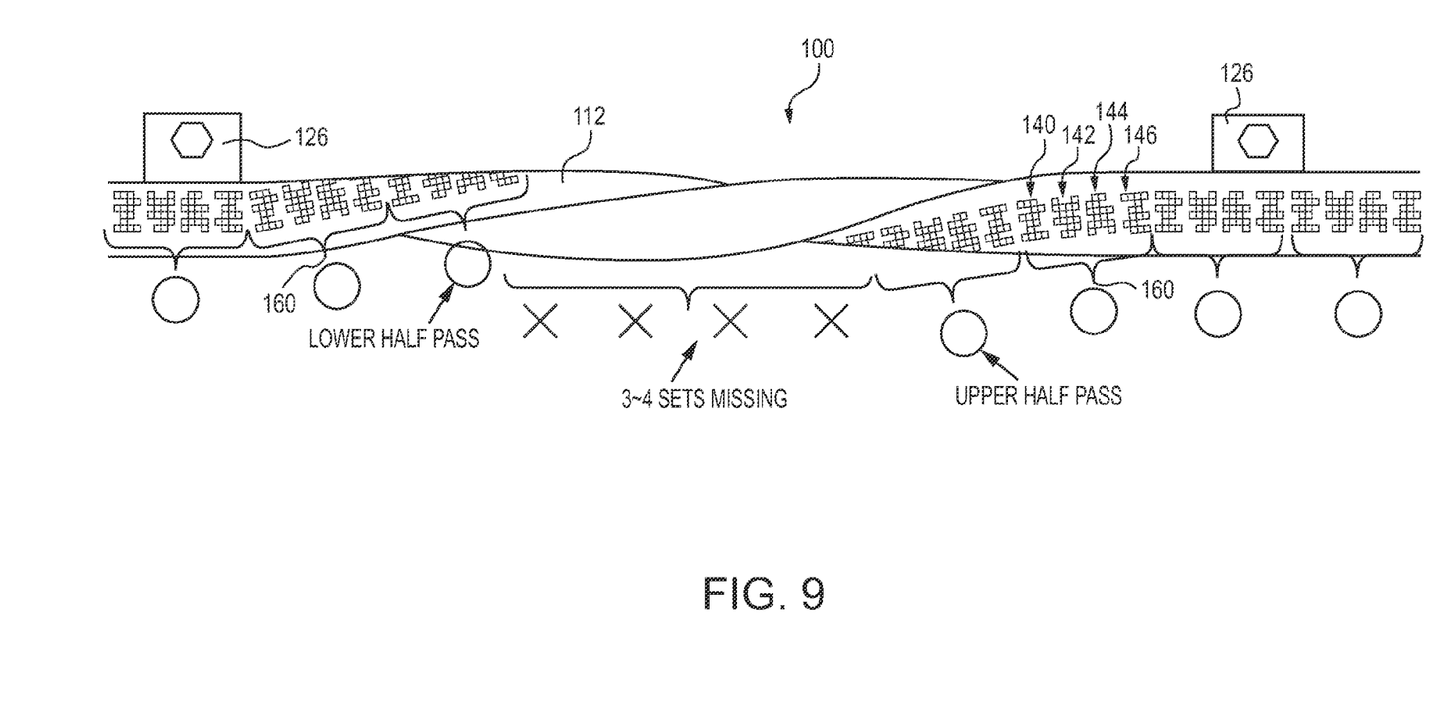
FIG. 9 schematically depicts in a twisted state a section of the side curtain airbag assembly of FIG. 1, which utilizes the printed sock depicted in FIG. 5.

As indicated above, by having the indicia 140, 142, 144, 146 as a whole including the upper portions and lower portions as separate teachable symbols, and with the designation of the edges of the pixels 170 as one of the manners for recognizing the separate teachable symbols, errors in detecting a twisted state of the cushion 110 can be reduced. For example, in the case of a bracket 126 located at least partially over one of the markings 160, several edges of the pixels 170 of that marking 160 are covered, which can cause the inspection system 150, when viewing each of the indicium 140, 142, 144, 146 as a whole, to flag that portion of the cushion 110 or sock 112 associated with that partially covered marking as possibly being in a twisted state. However, because the inspection system 150 also detects the exterior of pixel edges of each of the upper portions 180, 182, 184, 186 (which in this example would be significantly covered by the bracket 126 and be judged as a twisted state) and the exterior pixel edges of each of the lower portions 190, 192, 194, 196 (which in this example would not be covered by the bracket 126 and be judged as a non-twist state), the portion of the cushion 110 or sock 112 associated with the partially covered marking 160 depicted in FIG. 8 will be judged to be in the non-twist state. In the case of a piece of tape 200 covering the indicium 142, when viewing each of the indicium 140, 142, 144, 146 as a whole, a majority of the exterior pixel edges of the marking 160 are detected by the inspection system 150. Further, a majority of the exterior pixel edges of the upper portions 180, 184, 186 and the lower portions 190, 194, 196 are also detected by the inspection system 150. Therefore, the portion of the cushion 110 or sock 112 associated with the taped marking 160 depicted in FIG. 8 will be judged in the non-twist state. FIG. 9 depicts the sock 112 with certain portions of the sock being in a non-twist state and certain portions of the sock being in a twist state as determined by the detection of the markings 160 described above.

It should be appreciated that when a portion of the cushion 110 or sock 112 of the side cushion airbag assembly 100 is twisted, several adjacent occurrences of indicia groups or markings 160 become not visible to the inspection system 150. Not visible can mean a 0% detection of the indicia of the marking 160, which includes the individual indicium, the upper portion of each indicium and the lower portion of each indicium. Thus, if the inspection system 150 can detect a predetermined percentage of the marking 160, the side cushion airbag assembly is judged to be not twisted. For example, if the inspection system 150 detects 50% of the marking 160, the cushion 110 or sock 112 is judged to be not twisted because 50% detection could mean that the marking 160 is covered by a bracket, covered by tape or that portion of the cushion or sock associated with the 50% detected marking is starting to twist. However, if that portion of the cushion 110 or sock 112 is starting to twist, the next or adjacent marking 160 will also have a much lower percent match or no percent match at all. Therefore, the inspection system 150 is adapted to judge adjacent missing markings 160 as a twisted state. Again, because the inspection system 150 is looking for a condition of a missing marking 160, a low threshold percentage on the match of the markings can be set. For example, if the inspection system 150 detects only 50% of the lower portions of one of the markings, that would give a 25% match on the complete marking. Even though the inspection system 150 can only detect this small percentage of the marking as a whole, it can be enough to judge that the cushion 110 or sock 112 is not twisted. Thus, according to one aspect, to reduce errors in the inspection process, the inspection system 150 is looking for the absence of markings 160 to indicate that the cushion 110 or sock 112 of the side cushion airbag assembly 100 is twisted. In other words, the exemplary inspection system 150 is looking for the presence of some portion of the markings 160 to indicate that the cushion 110 or sock 112 is not twisted. Therefore, the inspection system 150 can allow for one of the markings 160 to disappear (i.e., a 0% match) because the cushion or sock cannot twist in that short of a distance (i.e., about 38 mm, the total width of each exemplary marking 160), and a twist will typically drop two or more adjacent markings 160.

With reference now to FIG. 10, printing of the indicia 140, 142, 144, 146 on the material of the sock 112 should have sufficient contrast and resolution to produce a clear pixel edge when viewed in grey scale. According to one aspect, contrast between the printed indicia 140, 142, 144, 146 and the material under white light should have a minimum separation of 120 shades of grey on a standard grey scale 210 having a range of 0 (black) to 255 (white). When determining the contrast separation, the average intensity of illumination should be such that the sock material produces a grey scale appearance between 220 and 240. The resolution of the printing of the indicia 140, 142, 144, 146 on the sock material should produce a pixel edge for each indicium that transitions from the printed indicium shade of grey to the unprinted material shade of grey within four (4) pixels when imaged with a machine vision camera where the resolution is about 2.54 pixels/mm under the prescribed illumination. The four (4) pixel transition refers to the number of pixels appearing in the captured image that are required to transition from the indicium shade of grey to the sock material shade of grey. Specifically, when examining the image and beginning from within the indicium shade of grey and moving toward the material shade of grey, the 1st pixel is the indicium shade of grey, the 2nd pixel is a lighter shade than the 1st, the 3rd pixel is a lighter shade than the 2nd and the 4th pixel is lighter than the 3rd and is the sock material grey scale shade which should have a shade between 220 and 240.

FIG. 11 depicts the exemplary automated vision inspection system 150 for detecting a twist in the side curtain airbag assembly 100. As shown, the side curtain airbag assemblies 100 are first installed in the vehicle 102. The installation of each side curtain airbag assembly 100 can be first judged by the human eye. Once installed, the human eye can follow the stripe-like appearance of the indicia running the length of the sock 112. Confirmation of proper installation is then made by the automated vision inspection system by processing images of the installation to automatically locate each occurrence of the four-indicium markings 160 and judge each one on completeness of appearance of the entire marking, the upper portions of the indicia and/or the lower portions of the indicia. Particularly, the vehicle is then moved to an inspection station where detectors 220, such as cameras, capture digital images 222, 224 and digital images 226, 228 of the respective left and right side curtain airbags. Because each side curtain airbag assembly 100 follows the contour of the vehicle 102 and the cushion 110 is flexible, each installation appears slightly different. Thus, the detectors 220 capture images of the side curtain airbag assembly along the length of the vehicle.

Figure 12:
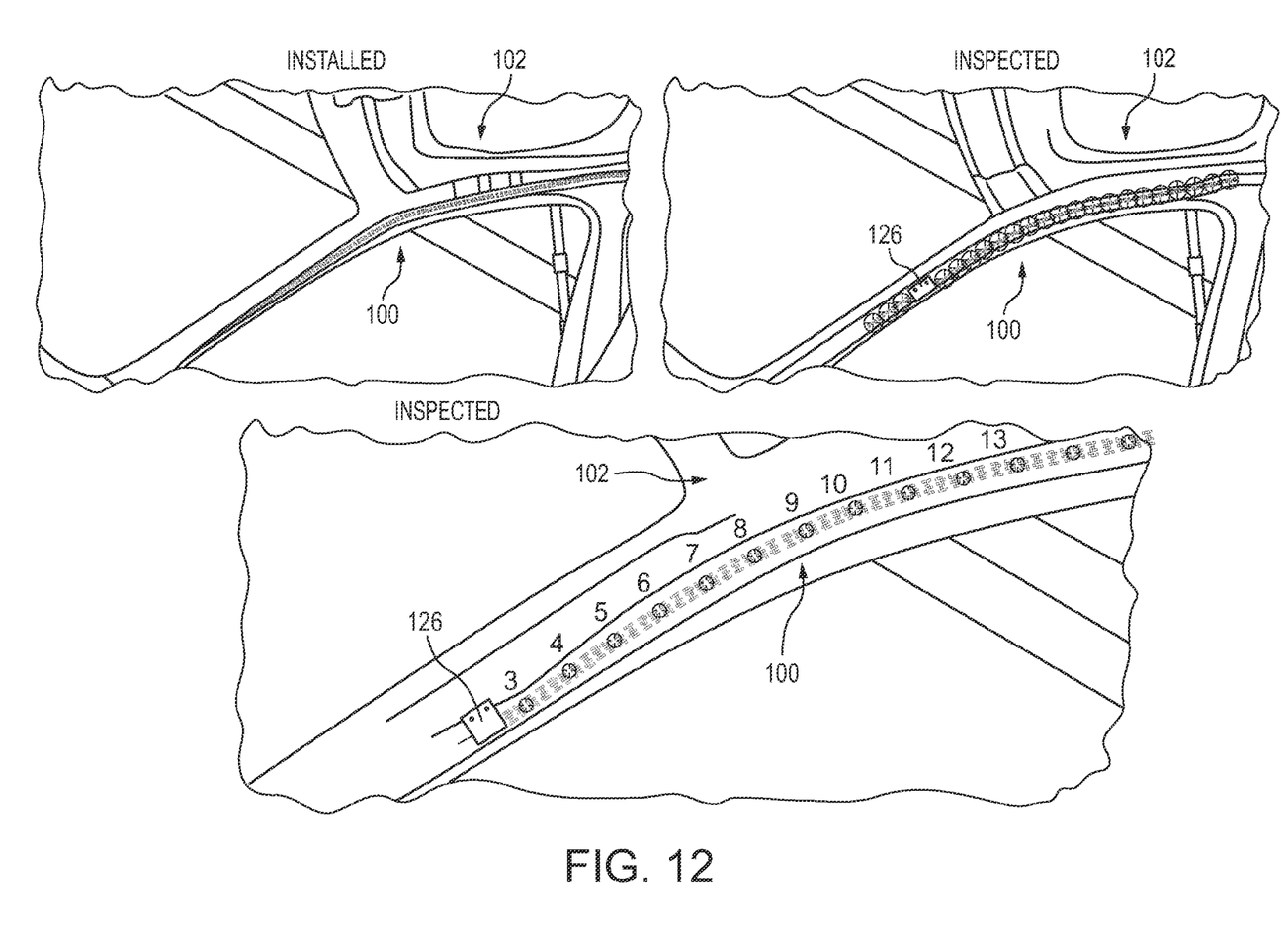
FIGS. 12 and 13 show the inspection and judgment of the side curtain airbag assembly by the automated inspection system of FIG. 11.
Figure 13:
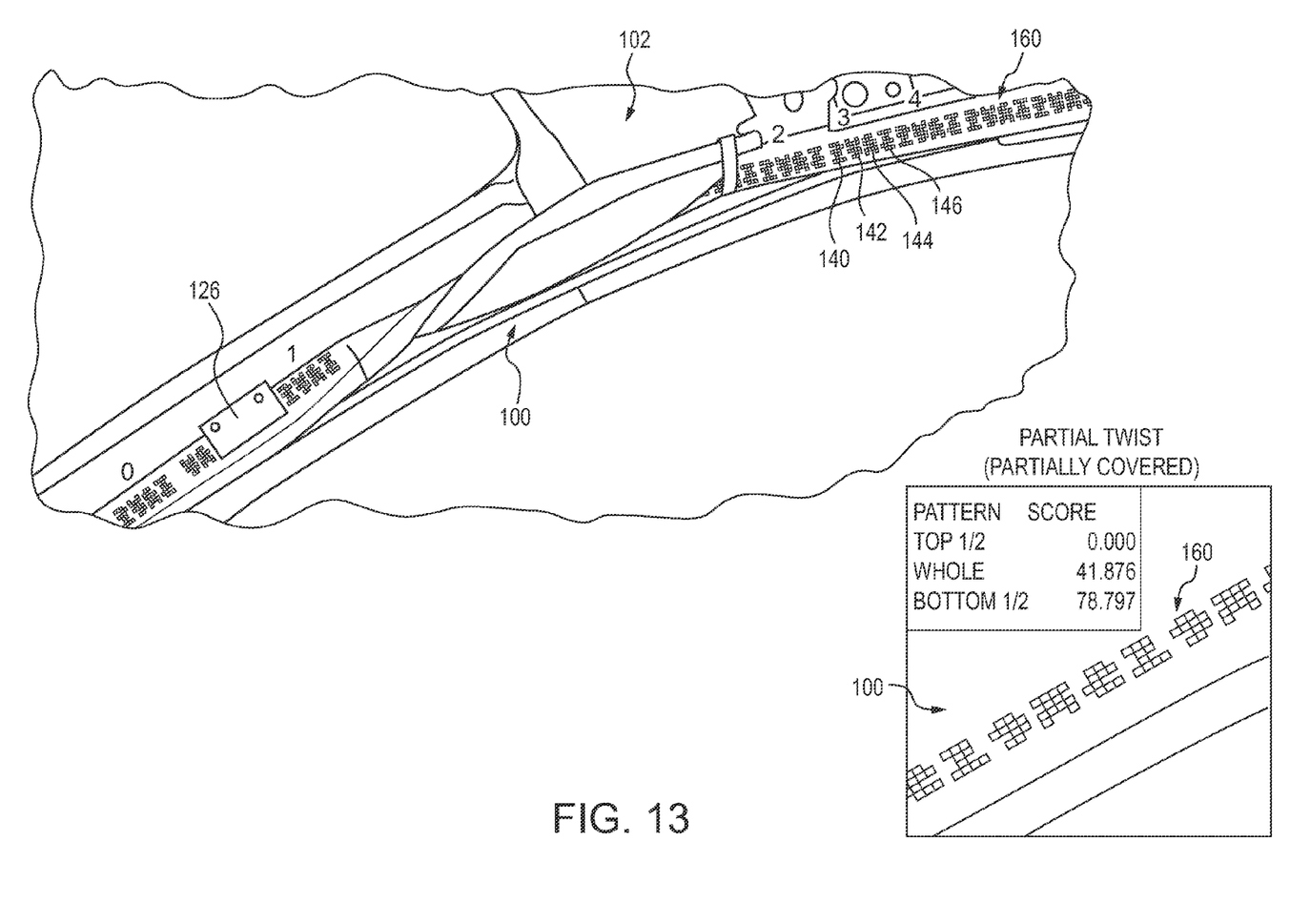

The vehicle can then be moved to a judgment station. The digital images are then sent to a controller 230. The controller 230 may take the form of any processing unit, such as a computer processing unit. Further, the controller 230 may be a single processing unit, or may take the form of multiple processing units. The controller 230 processes the images through imaging processing software that has been programmed to look for the markings 160 as described above and to access the installed condition of the cushion 110 or sock 112 by comparison of the digital image 222, 224, 226, 228 to master images of the markings 160. The features of the indicia 140, 142, 144, 146 which define each marking 160 being judged are selectively programmed for confirmation. To reduce the amount of pixels 170 being compared which thereby reducing the processing time, the software is programmed to pixelate the perimeter each indicium and compare the pixilated perimeters between the two captured images and master images. This comparison limits misinterpretation of a properly installed side cushion airbag assembly 100 due to the variations possible due to the flexible nature of the cushion 110. By way of example only, the pixels 170 of each of the markings 160 can be defined by 2×2 mm squares, and in the inspection system 150, these 2×2 mm squares become 5×5 mm pixels in a photographic bitmap. The distance between markings 160 can also be measured and compared to known limits. The markings 160 can also be counted by the inspection system 150. Particularly, the sock 112 being of known length will have a known count of marking repetitions over its length, and the count of repetitions can be verified. A twisted cushion 110 or sock 112 would fail this count confirmation. The layers of judgment when combined ensure proper judgment of the installed condition of the cushion 110 without numerous false detections causing production interruptions. FIGS. 12 and 13 show inspection and judgment of the markings 160 on the side curtain airbag assembly 100 by the automated inspection system 150.

Thus, the present disclosure improves the accuracy of automated inspection of side curtain airbag assemblies by utilizing the unique markings 160 on the cushion 110 or sock 112. The indicia 140, 142, 144, 146 that make-up each marking 160 can have long perimeters which increase the pixel counts of the perimeters of the indicia and thereby increase the effective resolution of the judgment scale being scored in the imaging processing software of the inspection system 150. For example, the unique shape of indicium 140 has thirty (30) edges that are defined by the pixels 170. By comparison, a simple square shaped indicium of the same size would only have twenty (20) edges, thus an increase of 50%. The indicia 140, 142, 144, 146 can have box-like features that make determining orientation clear. The indicia 140, 142, 144, 146 are also designed such that no left, right, top or bottom edge duplicates the left, right, top or bottom edge of another indicia which prevents the features of one indicium being misinterpreted as the edge of another indicium. The indicia 140, 142, 144, 146 are grouped into sets, e.g., set of four, making the short word or marking 160 which, when repeated along the length of the cushion 110 or sock 112 of the side cushion airbag assembly 100, allows the image processing software to find the marking 160, determine its orientation and judge its completeness in reference to a master image of the same indicia set. A shorter marking increases the match of the marking as the cushion 110 follows a curved path.

The indicia 140, 142, 144, 146 also have unique upper portions 180, 182, 184, 186 and lower portions 190, 192, 194, 196 that can be taught as recognizable markings independent of and in addition to the complete marking. In doing so, if part of the marking 160 is covered or not visible due a distortion in a portion of the side curtain airbag assembly 100, as long as a predetermined percentage of the upper portions or lower portions of the marking 160 can still be detected, a successful judgment can be made by the inspection system 150. In other words, if part of the marking 160 is visible, the inspection system 150 can successfully judge twist and not falsely indicate a twisted condition. Furthermore, the markings 160, the spacing between adjacent markings and the spacing between adjacent indicium of each marking 160 are of known dimensions and thus the image processing software can measure the distance between markings. By doing so, a twisted cushion 110 or sock 112 would remove several repetitions of the marking 160 from the image and be judged as twisted. Likewise, if one of the markings 160 is covered by device such as a bracket 126 that produces a spacing between markings greater than the known spacing between adjacent markings yet smaller than a gap typical of a twisted condition, the image can be judged correctly as not twisted. The design of the indicia 140, 142, 144, 146 is such that when the marking 160 is flipped 180 degrees, the same marking appearance exists. This feature allows more flexibly in manufacturing of the side cushion airbag assembly 100. The repeating markings 160 run the length of the cushion 110 or sock 112 and thus appear much like a stripe which is easily discernible by the human eye. The colors of the indicia can be unique to each side cushion airbag part type, thus further enhancing the easy judgment of the human eye.

The inspection system 150 can determine a match percentage of the pixels defining the edge of the inspected indicia 140, 142, 144, 146 and/or of the pixels within the area inscribed by the edges of the inspected indicia 140, 142, 144, 146 as compared to the same pixels of the master image. It should be appreciated that with edge detection, the number of pixels involved is much less than the number of pixels involved if the areas within the edges is used, and the number of pixels involved can directly affect processing time. However, edge detection and/or area comparison can be implemented by the controller 150 for determining if the cushion 110 or sock 112 is in a twisted state or non-twisted state.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by this disclosure.

What is claimed is:

1. An automated vision inspection system for detecting whether a cushion of a side curtain airbag assembly system is in a properly installed or twisted state, the system comprising:
    a plurality of markings arrayed along a longitudinal extent of one of a cushion or a sock covering the cushion of a side cushion airbag assembly, each marking including at least one indicium defined by a plurality of polygonal shaped pixels;
    a detector configured to capture digital images of the at least one indicium of the plurality of markings; and
    a controller configured to process the digital images captured by the detector and determine presence of the at least one indicium of the plurality of markings to access an installed condition of the cushion or sock by comparison of the digital images to master images,
    wherein each marking of the plurality of markings is defined by at least two indicia including a first indicium and a second indicium different than the first indicium.

2. The system of claim 1, wherein the markings of the at least two indicia are arrayed in a repeating manner along the longitudinal extent of the cushion or sock.

3. The system of claim 2, wherein each of the first indicium and second indicium is formed from a plurality of similarly shaped and sized interconnected pixels which together provide for first and second indicia having a predetermined height and width, and a predetermined spacing between adjacent markings is greater than a predetermined spacing between the first indicium and second indicium of each marking.

4. The system of claim 2, wherein each marking of the plurality of markings is further defined by a third indicium located adjacent the second indicium and a fourth indicium located adjacent the third indicium, each indicium having a differing shape.

5. The system of claim 4, wherein the third indicium is an ambigram of the second indicium and the fourth indicium is an ambigram of the first indicium.

6. The system of claim 2, wherein each marking of the plurality of markings is separable into at least two secondary markings, and the controller is configured to determine presence of each secondary marking and compare each detected secondary marking to the master images of the plurality of markings which include master images of the at least two secondary markings defined by each marking.

7. The system of claim 6, wherein the first indicium is separable into a first upper portion and a first lower portion and the second indicium is separable into a second upper portion and a second lower portion, the second upper and lower portions differing in shape from the first upper and lower portions, the first and second upper portions defining an upper secondary marking, the first and second lower portions defining a lower secondary marking.

8. The system of claim 2, wherein the controller is configured to detect edges of each marking to determine the orientation of the marking on the sock or cushion, wherein edges of the first indicium do not match edges of the second indicium in each marking.

9. The system of claim 8, wherein the plurality of pixels defining each of the first indicium and second indicium have non-intermeshing edges, the controller configured to detect the non-intermeshing edges of the plurality of pixels to reduce error during the automated inspection of the cushion or sock.

10. The system of claim 8, wherein the controller is configured to determine a match percentage of the pixels defining the edges of the first and second indicia or of the pixels within the area inscribed by the edges of the first and second indicia as compared to the same pixels of the master images, and the controller is configured to pixelate a perimeter of each of the first indicium and the second indicium to generate pixelated perimeters and compare the pixilated perimeters with the master images.

11. The system of claim 1, wherein the controller is configured to measure the distance between adjacent markings and count occurrences of the marking along the length of the cushion or sock to access the installed condition of the side cushion airbag assembly.

12. The system of claim 1, wherein a contrast of the at least one indicium and a contrast of the material of the cushion or sock having the at least one indicium printed thereon under white light has a minimum contrast separation of about 120 shades of grey on a standard grey scale having a range of 0 (black) to 255 (white).

* * * * *